Dec. 11, 1934.  J. LAMOND  1,983,618
FORGING APPARATUS
Filed Nov. 4, 1932   2 Sheets-Sheet 1
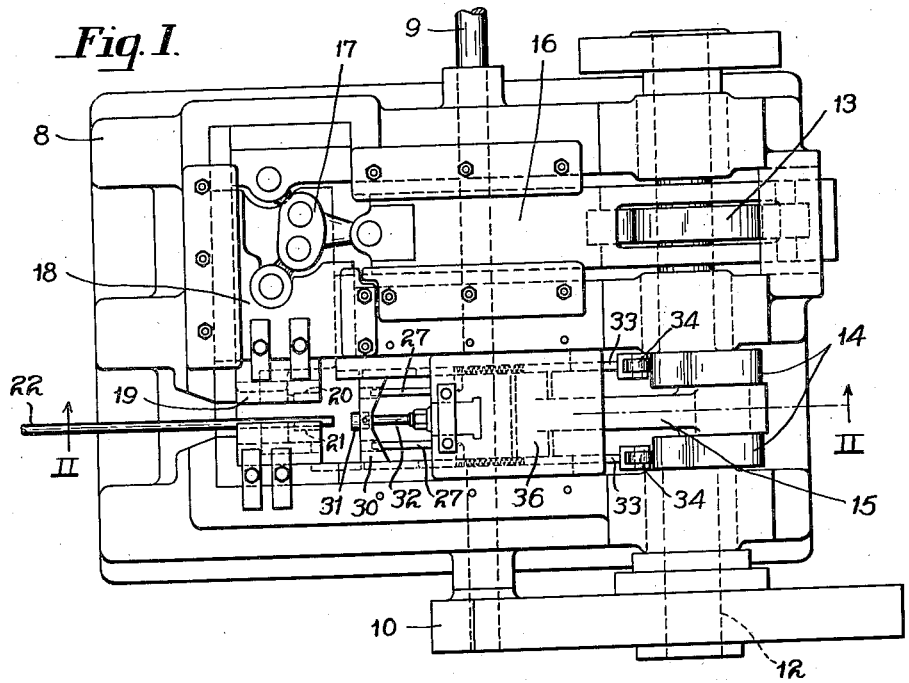
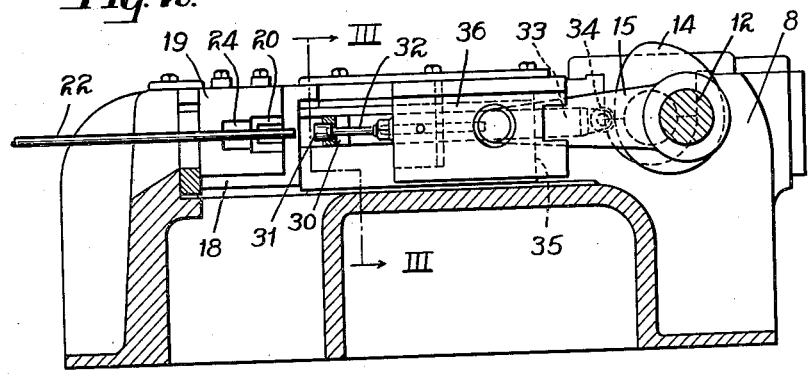
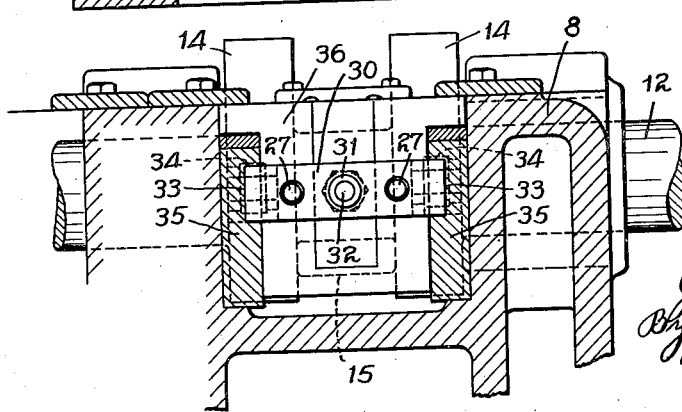

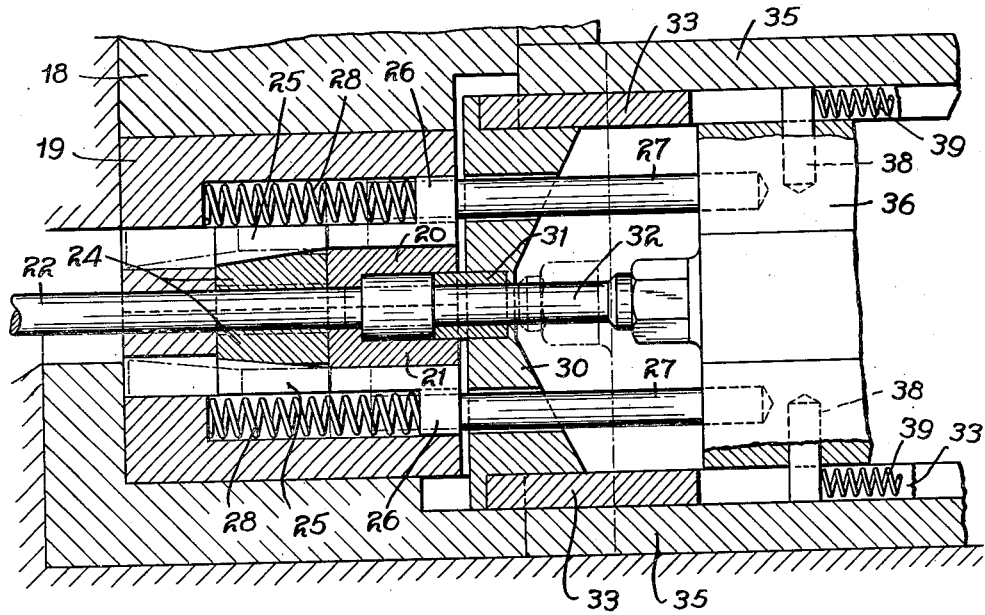
Fig. 4.
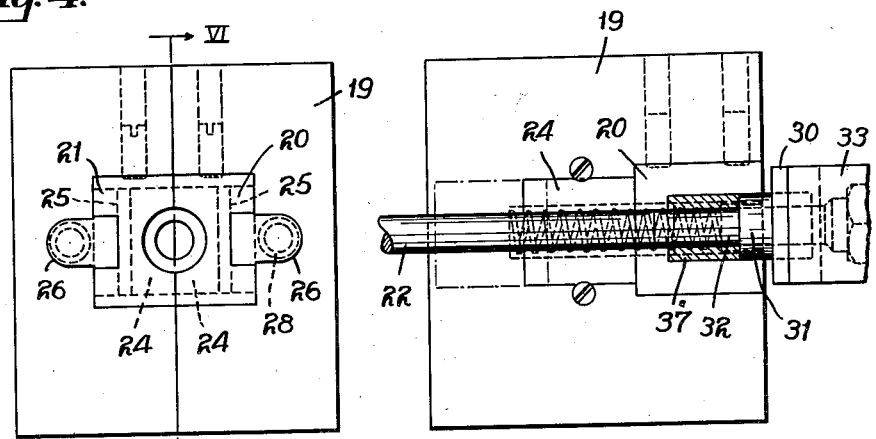
Fig. 5.
Fig. 6.
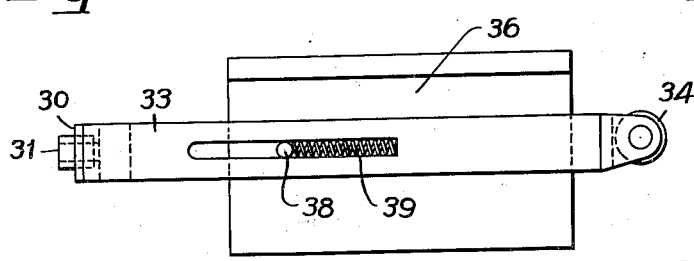
Fig. 7.

Patented Dec. 11, 1934

1,983,618

UNITED STATES PATENT OFFICE 1,983,618

FORGING APPARATUS

John Lamond, Allison Park, Pa., assignor to Pittsburgh Pipe & Coupling Company, Allison Park, Pa., a corporation of Pennsylvania Application November 4, 1932, Serial No. 641,238

2 Claims. (Cl. 78—63)

My invention relates to forging apparatus and more particularly to apparatus especially suitable for forming sleeve-like shapes or blanks, such as blanks for pipe unions, pipe couplings, nut blanks, etc.

One object of my invention is to provide apparatus whereby blanks of generally tubular shape may be formed from bar stock or the like by a single pass of the forging apparatus.

Another object of my invention is to provide an improved arrangement of upsetting and punching mechanism for operating upon bar stock.

One form of apparatus by which my invention may be practised is shown in the accompanying drawings, wherein Figure 1 is a plan view of a forging machine; Fig. 2 is a view taken on the line II—II of Fig. 1; Fig. 3 is a view, on an enlarged scale, taken on the line III—III of Fig. 2; Fig. 4 is a horizontal sectional view of a portion of the structure of Fig. 1, on an enlarged scale; Fig. 5 shows an end view of the dies; Fig. 6 is a view taken on the line VI—VI of Fig. 5, and Fig. 7 is a side elevational view of a portion of the apparatus of Fig. 2.

The apparatus is shown as mounted on a base or frame 8, and includes a drive shaft 9 that is journalled in the frame and has driving connection through a pinion 10 with a gear wheel 11 which is mounted on a crank shaft 12. The crank shaft 12 carries a cam 13, a pair of cams 14, and has a crank pin connected with a pitman 15.

A cam 13 operates a slide 16 to which a toggle device 17 is connected. One link of the toggle has connection with a die slide 18. The die slide carries a die block 19, in which a die 20 is secured. The die 20 has a semi-circular recess that cooperates with a similar recess in a stationary die 21, to form a cavity. This cavity may be of any desired form, and is here shown as having the contour of a pipe coupling, the end of bar stock 22 being upset therein as hereinafter explained, and the upset end then punched out to form a pipe coupling blank.

A pair of gripping members 24 are provided for holding the rod against slipping during the upsetting operation. The gripping members are held in engagement with the rod by wedge-like blocks 25 whose outer ends are out-turned as indicated at 26, for engagement with push rods 27 that are periodically brought into engagement therewith, to shift the blocks 25 longitudinally against the compression of springs 28, and thereby release the gripping members 24. The springs 28 serve to return the wedge blocks 25 to operative position, as shown in full lines in Fig. 4. When the wedge blocks 25 are seated as shown in Fig. 4, inward movement of the slide 18 will cause the gripping members 24 to firmly hold the bar stock 22 against longitudinal movement. When the wedge blocks 25 have been pushed to release position by the rods 27, the members 24 will, of course, be ineffective to grip the bar stock even though the die members 20 and 21 still have operative engagement with the bar.

When the die slide 18 is in released position, the bar stock 22 is advanced until its forward end extends forwardly of the dies 20—21 approximately the distance shown in Figs. 1 and 2. The slide 18 is then moved inwardly to cause the dies 20—21 and the gripping members 24 to engage the bar. Thereupon, the cam shaft 12 will have rotated to such extent that the upsetting and punching members will be brought into engagement with the protruding end of the bar.

The upsetting mechanism comprises a cross head 30 that rigidly supports a bushing 31, and slidably engages a punch 32. The cross head 30 is carried by push bars 33, which at their rear ends, have rollers 34 that engage with the cams 14. The push bars 33 are slidably supported in grooves formed in the side portions 35 of the frame 8. The punch 32 and push rods 27 are carried by a punch slide 36 which is operated by the pitman 15.

The cams 14 are of such contour that the cross head 30 will be advanced simultaneously with the advancing movement of the punch 32, with the front ends of the punch 32 and the bushing 31 flush, so that they together form an approximately smooth upsetting surface for the end of the bar 22. The upsetting movement results in filling of the cavity within the dies 20 and 21, the bushing 31 serving as the front wall of said cavity, as shown in Fig. 4.

At this stage, there is no further advancing movement of the cross head 30, but the punch 32 continues to advance to the position shown in Fig. 6. However, the bar stock 22 must be released to permit of this advance movement, and such release is effected by the rods 27 being brought into engagement with the extensions 26 of the wedge blocks 25, this engagement being effected approximately at the time the upsetting operation is completed.

Therefore, with the wedge blocks 25 released, the punch can move through the upset end of the bar stock, pushing the bar 22 back and shearing it from the upset portion thereof, thereby forming a pipe coupling blank 37.

At the completion of the operation just described, the die slide 18 will be drawn to retracted position, releasing the blank 37. Continued movement of the crank shaft will draw the punch 32 and the cross head 30 rearwardly, carrying with them the blank 37. The punch 32 continues its rearward movement past the point at which the cross head stops, and the coupling blank 37 is thereby stripped from the punch. Also, the push rods 27 will have released the wedge blocks 25, so that they may be returned to their operative positions by their springs.

A pair of studs 38 are carried by the punch slide 36 and serve as seats for springs 39 that lie within slots formed within the push bars 33, and seat against the end walls of said slots, so that they maintain the rollers 34 in operative engagement with the cams 14.

It will be understood that the gripping members 24 may be actuated by means other than wedge blocks 25 for periodically gripping the bar stock.

An important feature of my invention resides in the provision of the punch 32 and the bushing 31 of such form and operated in such manner that they first combine to function as an upsetting tool, and the bushing thereafter functions as an end wall of the cavity, while the punch 32 pierces the blank, during a single forward movement of the punch. The employment of the bushing 31, both as an upsetting element and as a wall of the die cavity insures the better filling of the die cavity, and facilitates removal of the blank.

I claim as my invention:—

1. Forging apparatus comprising a pair of gripping members for bar stock, a longitudinally-divided die positioned forwardly of the said members, to receive the forward portion of bar stock which is held by the gripping members and having a cavity of greater length than the length of articles to be formed therein and having an integral wall at its rear end, provided with a central opening of approximately the diameter of the bar stock, the cavity being completely open at its forward end, an upsetting tool of sleeve-like form movable into the forward end of the cavity and closely fitting the longitudinal walls thereof, a punch movable through said tool and the said central opening and being of substantially the same diameter as the said opening, means for moving the upsetting tool and the punch into the forward end of the cavity, with their forward ends approximately flush with one another, means for simultaneously gripping the bar stock by said members, means for continuing the advancing movement of the punch to the said central opening, after the tool and the punch have advanced a distance to completely upset the end of the bar stock within the cavity, and means for releasing the gripping members, to permit the bar stock to be forced backwardly by the said continued advancing movement of the punch, the cavity being of uniform cylindrical contour from end to end.

2. Forging apparatus comprising a pair of gripping members for bar stock, a longitudinally-divided die positioned forwardly of the said members, to receive the forward portion of bar stock which is held by the gripping members and having a cavity of greater length than the length of articles to be formed therein and having an integral wall at its rear end, provided with a central opening of approximately the diameter of the bar stock, the cavity being completely open at its forward end, an upsetting tool of sleeve-like form movable into the forward end of the cavity and closely fitting the longitudinal walls thereof, a punch movable through said tool and the said central opening and being of substantially the same diameter as the said opening, means for moving the upsetting tool and the punch into the forward end of the cavity, with their forward ends approximately flush with one another, means for simultaneously gripping the bar stock by said members, means for continuing the advancing movement of the punch to the said central opening, after the tool and the punch have been advanced a distance to completely upset the end of the bar stock within the cavity, and means for releasing the gripping members to permit the bar stock to be forced backwardly by the said continued advancing movement of the punch, the side walls of the cavity being disposed along lines parallel to its longitudinal axis.

JOHN LAMOND.